United States Patent [19]

Yun

[11] Patent Number: 5,559,565
[45] Date of Patent: Sep. 24, 1996

[54] CONVERGENCE CORRECTING METHOD AND APPARATUS FOR CORRECTING CONVERGENCE DISTORTION IN A CRT

[75] Inventor: Hong-Su Yun, Yongdeungpo-gu, Rep. of Korea

[73] Assignee: Samsung Electronics Co., Ltd., Kyungki-do, Japan

[21] Appl. No.: 111,503

[22] Filed: Aug. 25, 1993

[30] Foreign Application Priority Data

Aug. 25, 1992 [KR] Rep. of Korea ............... 92-15336

[51] Int. Cl.[6] ............... H04N 3/22; H04N 3/26
[52] U.S. Cl. ............... 348/806; 348/745; 315/370; 315/401
[58] Field of Search ............... 348/745, 806, 348/177, 807; 315/401, 370; H04N 3/22, 3/26

[56] References Cited

U.S. PATENT DOCUMENTS

| | | | |
|---|---|---|---|
| 3,950,671 | 4/1976 | Ichigaya et al. | 315/370 |
| 4,283,663 | 8/1981 | Miyoshi et al. | 315/401 |
| 4,754,334 | 6/1988 | Kriz et al. | 348/735 |

Primary Examiner—Victor R. Kostak
Assistant Examiner—John W. Miller
Attorney, Agent, or Firm—Sughrue, Mion, Zinn, Macpeak & Seas

[57] ABSTRACT

A difference is calculated between convergence data in accordance with a temperature detected from the deflecting coil of a cathode ray tube and optimum convergence data. The convergence of the cathode ray tube is then corrected in accordance with the calculated difference.

8 Claims, 3 Drawing Sheets

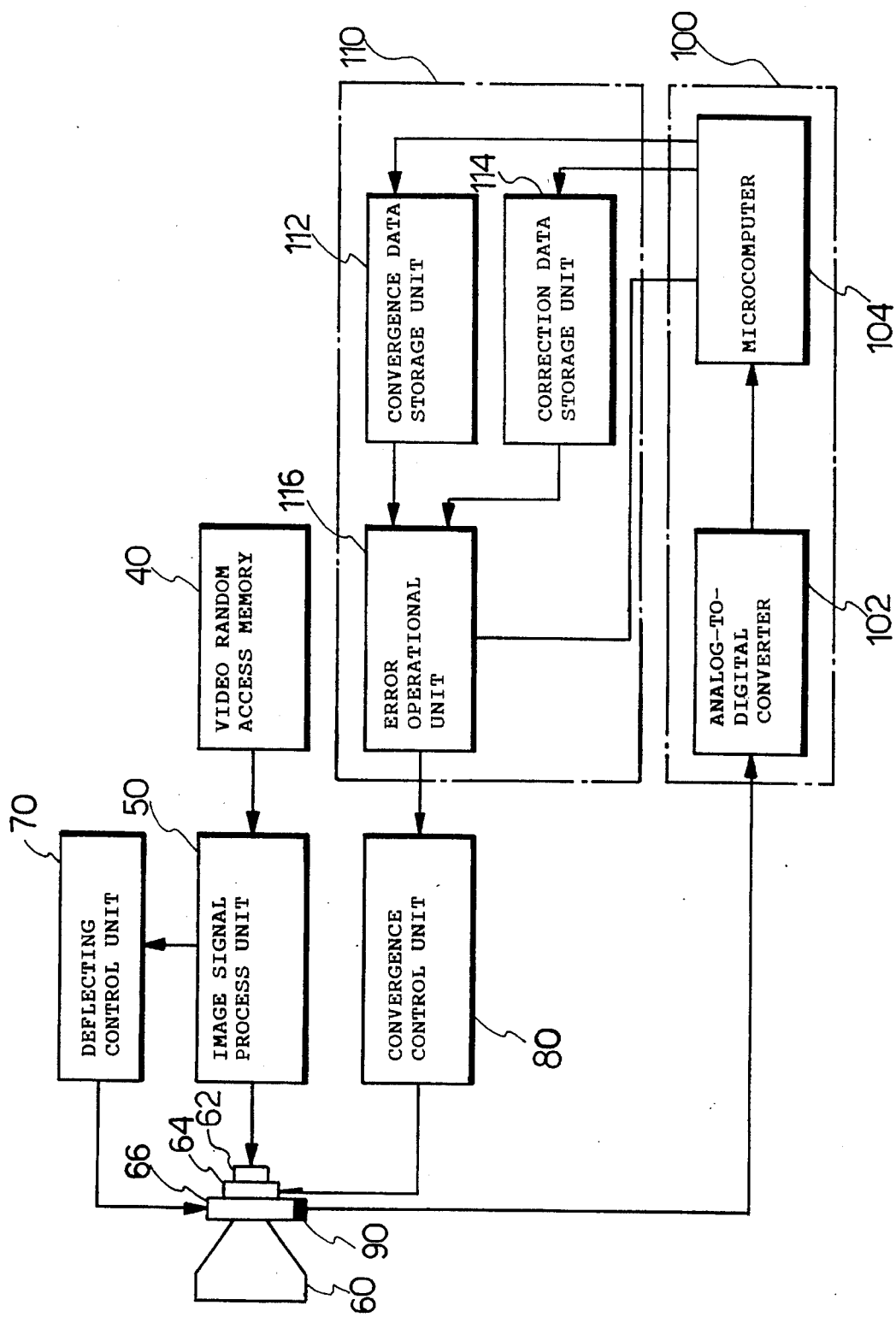

CONVERGENCE CORRECTING METHOD AND APPARATUS FOR CORRECTING CONVERGENCE DISTORTION IN A CRT

FIELD OF THE INVENTION

The present invention relates to an image display system using a cathode ray tube CRT as a projector, and more particularly to a convergence correcting method and an apparatus thereof for correcting a convergence distortion caused by heat generated from a deflecting coil.

BACKGROUND OF THE INVENTION

In a projection display system utilizing a cathode ray tube (CRT), electron beams emitted from an electron gun change directions according to the positions of vertical and horizontal deflecting coils to thereby illuminate a fluorescent screen of the CRT to thereby produce a pictorial image on the screen. A convergence coil within the CRT is disposed between three electron guns, corresponding to respective Red, Green and Blue (R,G,B) colors, and three deflecting coils, so that three portions of a pictorial image making up the respective Red, Green and Blue colors can be displayed to thereby generate one complete color image.

While the electron beams illuminate the fluorescent screen of the CRT, an inductance value inherent in the deflecting coils varies based on the generation of heat on the deflecting coils. Accordingly, a phenomenon of distorted convergence results and negatively affects the generation of the colored images composed of Red, Blue and Green colors.

In order to prevent the aforementioned problem, the prior art provided for a fan driven to thereby cool the deflecting coils, but this does not completely solve the convergence distortion.

Accordingly, a technique has been developed to correct the convergence of the projection display system by way of a separate convergence correcting apparatus. FIGS. 1 and 2A are schematic drawings of a projection display system having a conventional convergence correcting apparatus. Three CRTs 12, for generating Red (R), Green (G) and Blue (B) pictorial images, are disposed in respectively different positions as illustrated in FIG. 2A in the projection display system 10. In order to correct the distortion of the frontal projection display system 10, a Charge Coupled Device CCD camera 20 has been utilized.

Firstly, a grid-like pictorial image is projected to a screen 30 using the CRTs 12 of the projection display system 10. The CCD camera 20 connected to the projection display system 10 automatically controls the convergence. The CCD camera 20 detects the distortion of the convergence by analyzing the grid-like image displayed on screen 30. The convergence distortion detected by the CCD camera 20 is used to correct the convergence of the CRTs using a correcting apparatus located within the projection display system 10. FIG. 2B illustrates a convergence distortion of the projection display system 10 shown in FIG. 1. The distortion of the convergence illustrated by the disaccord between the continuous line and the dotted line.

However, with the above convergence collection technique, a separate CCD camera must be installed dedicated to convergence correction, thus increasing the manufacturing cost. On top of that, an accurate convergence distortion cannot be detected due to a screen reflection gain of the CCD cameras.

SUMMARY OF THE INVENTION

It is an object of the invention to correct convergence distortion in a CRT without greatly increasing the manufacturing costs.

It is a further object to accurately correct convergence distortion.

The present invention detects a temperature change generated from a deflecting coil to thereby correct a convergence distortion degree in accordance with inductance variations of the deflecting coil, so that an adequate convergence can always be maintained.

In order to obtain the above goals, the convergence correcting method of a projection display system in accordance with the present invention involves calculating a difference between convergence data obtained in accordance with a temperature detected from the deflecting coil of the CRT and an optimum convergence data. Then, the convergence is corrected in accordance with the calculated difference.

The convergence correcting apparatus in accordance with the present invention, has a video random access memory VRAM for storing and outputting a video signal of a test pattern, an image signal processing unit for processing the video signal outputted from the VRAM to thereby output the same to an electron gun of the CRT, a deflecting control circuit for outputting a control signal for controlling the deflection coils to adjust an image displayed on a screen, a control circuit for outputting a control signal for convergence correction in accordance with a temperature detected from the deflecting coil, a correction data calculating circuit for calculating convergence correction data in accordance with the convergence distortion degree based on the control signal of the control circuit, and a convergence control circuit for controlling the convergence in accordance with the convergence correction data calculated by the correction data calculating circuit.

BRIEF DESCRIPTION OF THE DRAWINGS

For a fuller understanding of the nature and objects of the invention, reference should be made to the following detailed description taken in conjunction with the accompanying drawings in which:

FIG. 3 is a block diagram of a desirable embodiment of a projection display system equipped with a convergence correcting apparatus in accordance with the present invention.

DETAILED DESCRIPTION OF THE PREFERRED EMBODIMENTS

Figure 1:
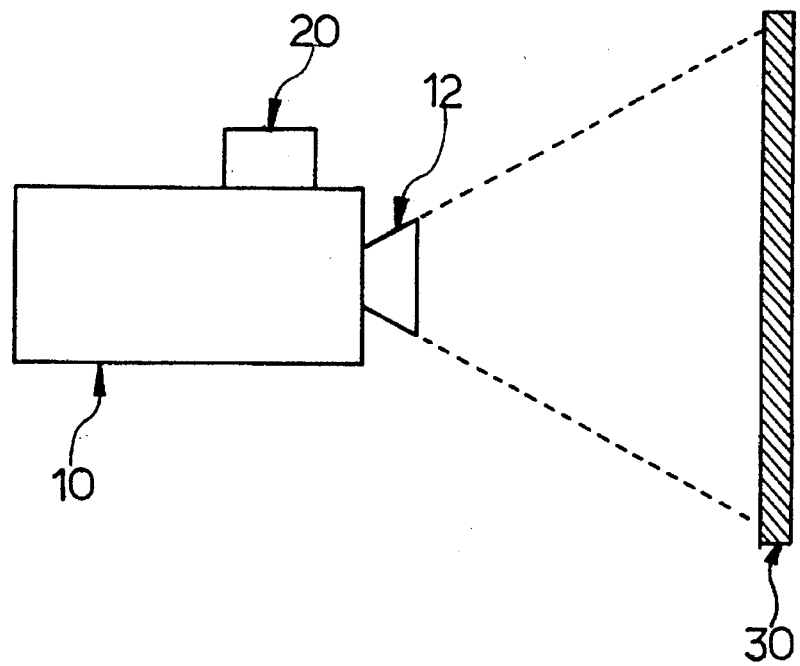
FIG. 1 a schematic drawing of a projection display system equipped with a conventional convergence correcting apparatus.
Figure 2A:
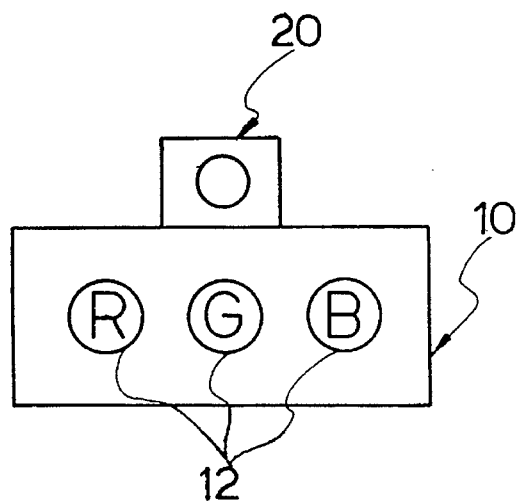
FIG. 2A is a front view of a projection display system as illustrated in FIG. 1.
Figure 2B:
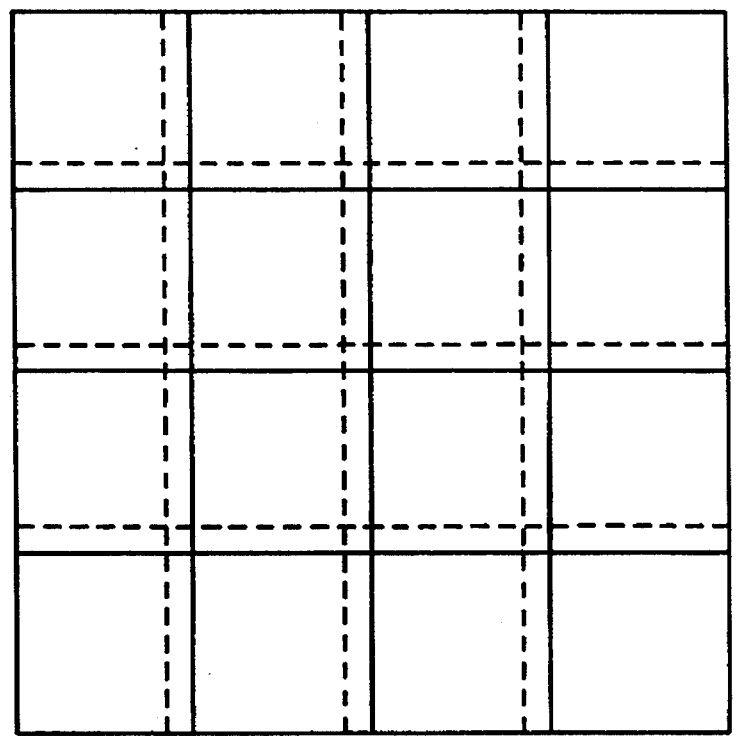
FIG. 2B is a constitutional diagram of convergence distortion in accordance with a projection display system as illustrated in FIG. 1.

FIG. 3 is a block diagram of a desired embodiment of a frontal projection display system equipped with a convergence correcting apparatus in accordance with the present invention.

The VRAM 40 outputs a video signal of a test pattern. An image signal processing unit 50 processes the video signal outputted from the VRAM 40 to thereby output the same to the electron gun 62 of the CRT 60. The electron gun 62 of the CRT 60 projects the electron beams to the screen in accordance with the signal outputted from the image signal processing unit 50. The deflecting control unit 70 controls a current flowing in the deflecting coil 66 of the CRT 60 to thereby change directions of the electron beams, so that a deflection of the pictorial images can be controlled. A convergence control unit 80 controls the current flowing in a convergence coil 64 to thereby control the convergence.

The construction thus described is a typical well-known construction. The present invention involves having the convergence control unit 80 control the convergence coil in a specific way to correct for convergence distortion caused by heating of the deflecting coil.

Specifically, a temperature sensor 90 senses a temperature of the deflecting coil 66. Here, the temperature sensor 90 converts heat generated from the deflecting coil 66 to voltage to thereafter output the same. A control circuit 100 outputs a control signal, reflecting a convergence distortion degree, based on the voltage outputted from the temperature sensor 90. A correction data calculating circuit 110 calculates correction data based on the control signal and then outputs the same. The correction data outputted from the correction data calculating means 110 is inputted into the convergence control unit 80 for control of the convergence coil 64, to then correct for convergence distortion based on the sensed temperature of the deflecting coil 66.

The control circuit 100 has an Analog-to-Digital Converter, ADC 102, for converting the voltage based on the temperature of the deflecting coil 66 outputted from the temperature sensor 90 to a digital signal. A microcomputer 104 is also included for processing the digital signal and outputting a control signal, representative of the convergence distortion degree, for controlling the convergence.

The correction data calculating circuit 110 includes a convergence data storage unit 112 wherein convergence data is stored in advance, such data represents data for controlling convergence accurately in a stable state of operation (e.g., 25 degrees Celsius), a correction data storage unit 114 wherein the convergence data in accordance with a currently-sensed temperature of the deflecting coil 66 is stored, and an error operational unit 116 for calculating a difference of the convergence data outputted from the convergence data storage unit 112 and the convergence data outputted from the correction data storage unit 114 in accordance with the control signal outputted from the microcomputer 104 of the control circuit 100.

An operational sequence of the convergence correcting method and the apparatus thereof thus constructed in accordance with the present invention will now be described.

First of all, the video signal of the test pattern outputted from the VRAM 40 is processed by the image signal process unit 50 to thereby be outputted to the electron gun 62 of the CRT 60. The electron gun 62 projects the electron beams to the screen in accordance with the signal outputted from the image signal process unit 50, and a deflecting control unit 70 controls the current flowing in the deflecting coil 66 of the CRT 60 to thereby change directions of the electron beams, so that the deflection of the pictorial images can be controlled.

The temperature of the deflecting coil 66 at this initial stage of operation is lower than the temperature under the stable state (conventionally 25 degrees Celsius) of the frontal projection display system. The temperature after a long time of operation is higher than that of the stable state. The temperature influences the characteristics of the deflecting coil 66 to thereby change the inductance thereof, and in accordance with the change of the inductance of the deflecting coil 66, the convergence is distorted.

To correct this problem, the temperature sensor 90 senses the temperature of the deflecting coil 66 to thereby convert the same to a voltage.

The ADC 102 of the control circuit 100 converts the voltage to digital temperature data. The microcomputer 104 outputs a control signal for controlling the convergence in accordance with the temperature data outputted from the ADC 102. The control signal is then inputted to the convergence data storage unit 112, correction data storage unit 114 and the error operational unit 116 of the correction data calculating circuit 110.

In other words, the convergence data storage unit 112 of the correction data calculating circuit 110 outputs a first convergence data in accordance with the control signal of the control circuit 100. Second convergence data, output from correction data storage unit 114, is the data in accordance with the temperature sensed at the deflecting coil 66, and the convergence is represented in a distorted state, based on the control signal from microcomputer 104, such a control signal indicating a convergence distortion degree. The error operational unit 116 obtains a difference between the first and second convergence data outputted from the convergence data storage unit 112 and the correction data storage unit 114. In other words, an error data corresponding to a distorted degree of the convergence in accordance with the currently-sensed temperature is calculated.

The error data outputted from the error operational unit 116 is inputted into the convergence control unit 80 which controls the current in the convergence coil 64 to thereby correct the convergence distortion caused by the heat of the deflecting coil 66.

Accordingly, the convergence correcting method and apparatus thereof in accordance with the present invention corrects the convergence distortion generated from the heat of the deflecting coil of the CRT to thereby achieve an effect of maintaining a constant convergence at all times regardless of temperature changes.

In the above-mentioned description, one CRT was discussed in order to simplify the explanation. However, in the frontal projection display system utilizing three CRTs, it is necessary to control simultaneously three CRTs for generating respective Red, Green and Blue colors in order to obtain an adequate convergence.

The foregoing description and drawings are illustrative and are not to be taken as limiting. Still other variations and modifications are possible without departing from the spirit and scope of the present invention.

Specifically, in the aforesaid embodiment, the convergence correcting apparatus in the frontal projection display system has been explained but a convergence correcting apparatus in a rear projection display system can be materialized without departing from the spirit and the scope of the present invention.

What is claimed is:

1. A convergence correcting method of an image system having a cathode ray tube comprising the steps of:

detecting a temperature of a deflecting coil of the cathode ray tube;

calculating a difference between distorted convergence data obtained in accordance with the detected temperature and optimum convergence data; and correcting a convergence by adjusting a field produced by a convergence coil of the cathode ray tube in accordance with the calculated difference;

wherein the optimum convergence data is pre-calculated and is of such a value as to accurately control the convergence of the image system in a stable temperature state of the deflecting coil.

2. The method of claim 1 wherein the stable temperature state is approximately 25 degrees Celsius.

3. A circuit for correcting convergence distortion in a cathode ray tube, comprising:

a deflecting coil;

a convergence coil;

a temperature sensor detecting a temperature of said deflecting coil and outputting a temperature-indicative signal;

a control circuit converting the temperature-indicative signal into a control signal;

a calculating circuit comprising a first storage area storing and outputting predetermined convergence data representative of a desired stable state operation of said deflecting coil, a second area receiving the control signal and outputting actual convergence data, and an error operational unit calculating a difference between the actual convergence data and the predetermined convergence data; and a convergence control unit controlling said convergence coil in accordance with the calculated difference.

4. A convergence correcting apparatus comprising:

a video random access memory means for outputting a video signal of a test pattern;

an image signal processing means for processing the video signal outputted from the video random access memory means to thereby output a processed video signal to an electron gun of a cathode ray tube;

a deflecting control means for controlling a deflecting coil of the cathode ray tube to thereby adjust a deflection of a screen image;

control means for outputting a control signal for convergence correction in accordance with a temperature detected from the deflecting coil of the cathode ray tube;

correction data calculating means for calculating correction data in accordance with a convergence distortion degree based on said control signal of the control means;

a convergence control unit for controlling a convergence coil of the cathode ray tube to thereby adjust the convergence in accordance with the correction data calculated by said correction data calculating means, and a temperature sensor for detecting the temperature of the deflecting coil;

wherein said correction data calculating means comprises:

a convergence data storage unit where first convergence data is stored;

a correction data storage unit where second convergence data in accordance with a currently-sensed deflecting coil temperature is stored; and an error operational unit for calculating a difference between convergence data outputted from said convergence data storage unit and convergence data outputted from said correction data storage unit in accordance with the control signal outputted from said control means.

5. A convergence correcting apparatus as defined in claim 4, wherein said temperature sensor converts heat generated from the deflecting coil to a voltage indicative of the temperature of the detecting coil and outputs the voltage.

6. A convergence correcting apparatus as defined in claim 4, wherein the control means comprises:

an analog-to-digital converter for converting the voltage outputted from said temperature sensor to a digital signal; and a microcomputer for receiving the digital signal and outputting the control signal.

7. A convergence correcting apparatus as defined in claim 4, wherein the first convergence data stored in said convergence data storage unit is data of such a value as to accurately control the convergence of the image system in a stable temperature state.

8. The apparatus of claim 7 wherein the stable temperature state is approximately 25 degrees Celsius.

* * * * *